US009035957B1

(12) United States Patent
Mahan et al.

(10) Patent No.: US 9,035,957 B1
(45) Date of Patent: May 19, 2015

(54) PIPELINE DEBUG STATISTICS SYSTEM AND METHOD

(75) Inventors: Justin Michael Mahan, Fremont, CA (US); Christopher J. Mills, Saratoga, CA (US); Edward A. Hutchins, Mountain View, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1137 days.

(21) Appl. No.: 11/893,443

(22) Filed: Aug. 15, 2007

(51) Int. Cl.
*G06F 15/80* (2006.01)
*G06T 1/20* (2006.01)
*G05B 11/01* (2006.01)
*G06F 11/34* (2006.01)

(52) U.S. Cl.
CPC .. *G06F 11/34* (2013.01); *G06T 1/20* (2013.01)

(58) Field of Classification Search
CPC .................................. G06F 11/34; G06T 1/20
USPC ............. 345/501, 505, 506; 700/26; 712/227; 717/124
See application file for complete search history.

(56) References Cited

U.S. PATENT DOCUMENTS

| | | | | |
|---|---|---|---|---|
| 5,594,854 | A * | 1/1997 | Baldwin et al. | 345/441 |
| 5,643,086 | A | 7/1997 | Alcorn et al. | |
| 5,752,062 | A | 5/1998 | Gover et al. | |
| 5,757,919 | A | 5/1998 | Herbert et al. | |
| 5,764,228 | A * | 6/1998 | Baldwin | 715/797 |
| 5,815,154 | A | 9/1998 | Hirschtick et al. | |
| 5,903,278 | A * | 5/1999 | Mitchell et al. | 345/589 |
| 5,917,502 | A * | 6/1999 | Kirkland et al. | 345/505 |
| 5,978,484 | A | 11/1999 | Apperson et al. | |
| 6,016,474 | A | 1/2000 | Kim et al. | |
| 6,111,584 | A * | 8/2000 | Murphy | 345/582 |
| 6,157,618 | A | 12/2000 | Boss et al. | |
| 6,314,470 | B1 * | 11/2001 | Ward et al. | 719/328 |
| 6,330,008 | B1 | 12/2001 | Razdow et al. | |
| 6,362,825 | B1 | 3/2002 | Johnson | |
| 6,587,995 | B1 * | 7/2003 | Duboc et al. | 716/106 |
| 6,609,193 | B1 * | 8/2003 | Douglas et al. | 712/219 |
| 6,609,977 | B1 * | 8/2003 | Shimizu et al. | 463/36 |
| 6,615,368 | B1 * | 9/2003 | Dunlap | 714/30 |
| 6,658,578 | B1 * | 12/2003 | Laurenti et al. | 713/324 |
| 6,662,256 | B1 * | 12/2003 | Foo | 710/305 |
| 6,668,325 | B1 | 12/2003 | Collberg et al. | |
| 6,732,060 | B1 | 5/2004 | Lee | |
| 6,778,181 | B1 * | 8/2004 | Kilgariff et al. | 345/582 |
| 6,901,582 | B1 | 5/2005 | Harrison | |

(Continued)

OTHER PUBLICATIONS

Duca et al.; A relational debugging engine for the graphics pipeline; Jul. 2005; ACM Transactions on Graphics; vol. 24; pp. 453-463.*

(Continued)

*Primary Examiner* — David T Welch (57) ABSTRACT

An efficient pipeline debug statistics system and method are described. In one embodiment, an efficient pipeline debug is utilized in a graphics processing pipeline of a handheld device. In one embodiment, a pipeline debug statistics system includes a plurality of pipeline stages with probe points, a central statistic component, and a debug control component. The plurality of pipeline stages with probe points perform pipeline operations. The central statistic block gathers information from the probe points. The debug control component directs the gathering of information from the probe points. In one exemplary implementation, debug control component can direct gathering of information at a variety of levels and abstraction.

17 Claims, 6 Drawing Sheets

(56) References Cited

U.S. PATENT DOCUMENTS

| | | |
|---|---|---|
| 6,943,800 B2 | 9/2005 | Taylor et al. |
| 7,047,519 B2 | 5/2006 | Bates et al. |
| 7,095,416 B1 | 8/2006 | Johns et al. |
| 7,107,484 B2 | 9/2006 | Yamazaki et al. |
| 7,173,635 B2 | 2/2007 | Amann et al. |
| 7,237,151 B2 | 6/2007 | Swoboda et al. |
| 7,260,066 B2 | 8/2007 | Wang et al. |
| 7,277,826 B2 | 10/2007 | Castelli et al. |
| 7,383,205 B1 | 6/2008 | Peinado et al. |
| 7,395,426 B2 | 7/2008 | Lee et al. |
| 7,420,563 B2 | 9/2008 | Wakabayashi |
| 7,486,290 B1* | 2/2009 | Kilgariff et al. ........... 345/426 |
| 7,505,953 B2 | 3/2009 | Doshi |
| 7,555,499 B2 | 6/2009 | Shah et al. |
| 7,703,076 B1* | 4/2010 | Kocot ........... 717/125 |
| 7,765,500 B2 | 7/2010 | Hakura et al. |
| 7,778,800 B2 | 8/2010 | Aguaviva et al. |
| 2001/0044928 A1 | 11/2001 | Akaike et al. |
| 2002/0032558 A1* | 3/2002 | Strong et al. ........... 703/22 |
| 2002/0157086 A1 | 10/2002 | Lewis et al. |
| 2003/0043022 A1 | 3/2003 | Burgan et al. |
| 2003/0197705 A1* | 10/2003 | Kawai et al. ........... 345/505 |
| 2003/0214660 A1 | 11/2003 | Plass et al. |
| 2004/0085894 A1 | 5/2004 | Wang et al. |
| 2004/0130552 A1 | 7/2004 | Duluk, Jr. et al. |
| 2004/0168155 A1* | 8/2004 | O'Farrell et al. ........... 717/129 |
| 2004/0243371 A1* | 12/2004 | Gutkovich et al. ........... 703/14 |
| 2005/0122334 A1* | 6/2005 | Boyd et al. ........... 345/520 |
| 2005/0135685 A1* | 6/2005 | Huang et al. ........... 382/233 |
| 2005/0209946 A1* | 9/2005 | Ballow et al. ........... 705/35 |
| 2005/0222881 A1 | 10/2005 | Booker |
| 2005/0243094 A1 | 11/2005 | Patel et al. |
| 2005/0273652 A1 | 12/2005 | Okawa et al. |
| 2005/0278684 A1 | 12/2005 | Hamilton et al. |
| 2005/0280655 A1* | 12/2005 | Hutchins et al. ........... 345/581 |
| 2006/0026179 A1* | 2/2006 | Brown et al. ........... 707/100 |
| 2006/0079333 A1 | 4/2006 | Morrow et al. |
| 2006/0080625 A1 | 4/2006 | Bose et al. |
| 2006/0109846 A1 | 5/2006 | Lioy et al. |
| 2006/0155387 A1* | 7/2006 | Pieronek ........... 700/1 |
| 2006/0161761 A1 | 7/2006 | Schwartz et al. |
| 2006/0185017 A1 | 8/2006 | Challener et al. |
| 2007/0115292 A1 | 5/2007 | Brothers et al. |
| 2007/0274284 A1 | 11/2007 | Dendukuri et al. |
| 2008/0007563 A1 | 1/2008 | Aronson et al. |
| 2008/0033696 A1* | 2/2008 | Aguaviva et al. ........... 702/186 |
| 2008/0034311 A1* | 2/2008 | Aguaviva et al. ........... 715/771 |
| 2008/0095090 A1 | 4/2008 | Lee et al. |
| 2008/0117221 A1* | 5/2008 | Hutchins et al. ........... 345/506 |
| 2009/0037774 A1* | 2/2009 | Rideout et al. ........... 714/38 |
| 2009/0222795 A1* | 9/2009 | Frank et al. ........... 717/127 |

OTHER PUBLICATIONS gDEBugger GL Tutorial; Jun. 2006; Graphic Remedy; Selected sections.*

C. Cebenoyan and M. Wloka, "optimizing the graphics pipeline", 2003, Nvidia GDC Presentation Slide.

gDEBugger, graphicREMEDY, http://www.gremedy.com/, Jul. 29, 2005.

"maxVUE Graphic Editor", Metso Automation, 2005, pp. 1-6, http://www.metsoautomation.com/automation/indes.nsf/FR?Readform&ATL=automation/ed_prod.nsf/WebWID/WTB-041110-22256F-2445A; eHB.

"ATI Radeon X800, 3D Architecture White Paper", ATI, 2005, pp. 1-13, with proof of seniority (4pages), according to ACM bibliography regarding the document: "The Direct3D 10 system", ACM TOG, vol. 25, Iss.3 (Jul. 2006).

N. Tatarchuk, "New RenderMonkey Features for DirectX and OpenGL Shader Development", Game Developers Conference, Mar. 2004.

Duca et al.; A Relational Debugging Engine for the Graphics Pipeline; International Conference on Computer Graphics and Interactive Techniques; ACM SIGGRAPH 2005; pp. 453-463; ISSN:0730-0301.

* cited by examiner

PIPELINE DEBUG STATISTICS SYSTEM AND METHOD

FIELD OF THE INVENTION

The present invention relates to the field of graphics processing.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Electronic systems designed to produce these results usually involve interfacing with a user and the interfacing often involves presentation of graphical images to the user. Displaying graphics images traditionally involves intensive data processing and coordination requiring considerable resources and often consuming significant power.

An image is typically represented as a raster (an array) of logical picture elements (pixels). Pixel data corresponding to certain surface attributes of an image (e.g. color, depth, texture, etc.) are assigned to each pixel and the pixel data determines the nature of the projection on a display screen area associated with the logical pixel. Conventional three dimensional graphics processors typically involve extensive and numerous sequential stages or "pipeline" type processes that manipulate the pixel data. A relatively significant amount of processing and memory resources are usually required to implement the numerous stages of a traditional pipeline.

A number of new categories of devices (e.g., such as portable game consoles, portable wireless communication devices, portable computer systems, etc.) are emerging where displaying graphics on relatively small size displays and power consumption of limited supplies (e.g., a battery) are a significant concern. User experience is usually very important in graphics applications and glitches in image presentation usually have a deleterious effect on user experience. Image presentation problems wasted power expenditures are often the result of pipeline processing and flow issues which can be relatively complex and complicated to detect. Ensuring proper and efficient processing operations often depends upon effective performance monitoring. Ascertaining and analyzing graphics pipeline performance information is often very difficult and traditional approaches to gathering performance monitoring information are usually limited.

SUMMARY

An efficient pipeline debug statistics system and method are described. In one embodiment, an efficient pipeline debug system and method is utilized in a graphics processing pipeline of a handheld device. In one embodiment, a pipeline debug statistics system includes a plurality of pipeline stages with probe points, a central statistic component, and a debug control component. The plurality of pipeline stages with probe points perform pipeline operations. The central statistic block gathers information from the probe points. The debug control component directs the gathering of information from the probe points. In one exemplary implementation, debug control component can direct gathering of information at a variety of levels and abstraction.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, logic, other such information storage, transmission or display devices, etc.) into other data similarly represented as physical quantities within other components.

The present invention provides efficient and convenient graphics data organization and processing. Processing of graphics information is facilitated by utilization of an efficient operational statistics and debug system and method. In one embodiment, the debug system and method facilitates debugging in a variety of flexible approaches including drilling down into different levels of information gathering. In one exemplary implementation, the different levels include debugging and statistic gathering at a primitive level, vertices level and/or a pixel level. In addition, embodiments of the present invention can provide flexible organization of graphics information and statistics and debugging information gathering.

Figure 1A:
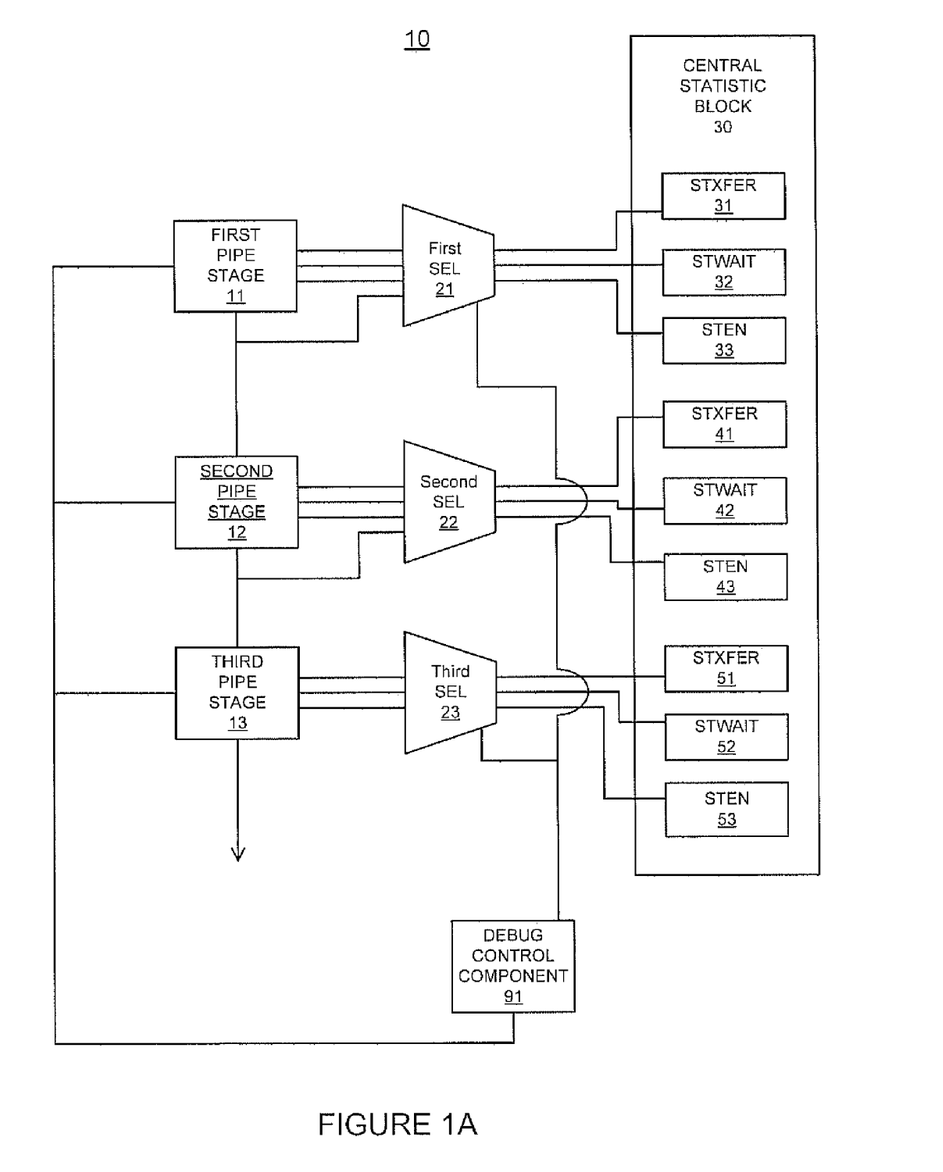
FIG. 1A is a block diagram of an exemplary pipeline in accordance with one embodiment of the present invention.

FIG. 1A is a block diagram of an exemplary pipeline 10 in accordance with one embodiment of the present invention. Pipeline 10 includes first pipeline stage 11, second pipeline stage 12, third pipeline stage 13, first selection component 21, second selection component 22, third selection component 23, central statistic component 30 and debug control component 91. First pipeline stage 11 is coupled to second pipeline stage 12 which is coupled to third pipeline stage 13. First pipeline stage 21 is coupled to first selection component 21, second pipeline stage 22 is coupled to second selection component 22, and third pipeline stage 23 is coupled to third selection component 23. First selection component 21, second selection component 22 and third selection component 23 are coupled to central statistic component 30. Debug control component 91 is coupled to first pipeline stage 11, second pipeline stage 12, third pipeline stage 13, selection component 21, selection component 22, and selection component 23.

The components of exemplary pipeline 10 cooperatively operate to perform graphics processing operations and efficient debugging. First pipeline stage 11, second pipeline stage 12 and third pipeline stage 13 perform graphics processing operations and include probe points. The probe points can be utilized monitor and gather information associate with performance monitoring. For example, the probe points can be utilized to capture statistic and debug information. The probe points forward the statistic and debug information to selection components 21, 22 and 23. Debug control component 91 directs the gathering of information from the probe points. For example the debug control component 91 directs operations by the selection components 21, 22 and 23 in the forwarding of signals from the first pipeline stage 11, second pipeline stage 12 and third pipeline stage 13 to the central statistic component 30 respectively. In one embodiment, debug control component sets a debug indication in a pipeline information packet. Selection components 21, 22 and 23 forward information from respective pipeline stages 11, 12, and 23 to the central statistic component 30. Central statistic component 30 collects statistics on the information forwarded to it.

In one embodiment, central statistic component 30 includes statistic and debug information tracking components for tracking a variety of statistic and debug metrics. The statistic and debug information tracking components can include counters for counting occurrence of events. The statistic and debug information tracking component can also include registers for storing the information. In one exemplary implementation, central statistic component 30 includes statistic transfer (STXFER) components (e.g., 31, 41 and 51), statistic wait (STWAIT) components (e.g., 32, 42 and 43), and first statistic enable (STEN) components (e.g., 33, 43, and 53). The statistic transfer component gathers information associated with a transfer metric indicating when a transfer operation takes place. In one embodiment, the transfer taking place corresponds to the upstream stage being valid and the downstream stage not being stalled. The statistic wait component gathers information on a wait metric indicating when a wait operation occurs. In one embodiment, the wait tracks when a transfer is forced to wait. In one exemplary implementation, a wait corresponds to an upstream stage being valid and a downstream stage being stalled. The statistic enable component gathers information on an enable metric indicating when an enable occurs. In one embodiment, the enable metric is a local copy of a statistic enable bit at a probe point.

It is appreciate that the present system can be altered to accommodate a variety of metrics. In one embodiment, metrics for measuring access to a cache and cache misses can be measured. The metric information can be communicated directly to a central statistic component or encoded.

In one exemplary implementation, the statistic or stat bus from the probe points to the central statistic component includes three communication paths (e.g., "wires", traces, etc.) and the paths carry signals associated with the transfer metric, the wait metric and the enable metric. Additional wires can be included to carry the information associated with the new metrics or existing wires can be reassigned. In one exemplary implementation, a wire associated with a statistic transfer metric is reassign to a cache access and a wire associated with a statistic wait metric is reassigned to a cache miss.

In one embodiment, the statistic bus signals (e.g., a transfer signal, wait signal, enable signal, etc.) are driven low when statistics are not being collected. In one exemplary implementation, statistic collection is enabled by setting and detecting a global instrument indication pass a probe point with the statistic enable indication (STAT_EN) asserted and disabled with the statistic enable indication is deasserted For example, STAT_EN=1 if a logical 1 indicates assertion and STAT_EN=0 if a logical 1 indicates assertion, or vise versa. Each module or pipeline stage snoops STAT_EN and sets a local copy of it at the probe point. Some modules or stages may need more than one copy if there are multiple stats sampled at different points in the pipeline. In one exemplary implementation, software can insert instrument communication paths or traces around events of interest and get correct counts regardless of the pipelined nature of a three dimensional graphics statistics indication.

In one embodiment, signals that are carrying information associated with enabled statistic and debug metrics are allowed to transition or "toggle" on communication paths back to the central statistic component without transitioning or "toggling" debug signals not associated with the enabled metrics. For example, if a direction is issued to gather transfer statistic information from a first stage, no performance statistic information form a second stage and transfer and enable statistic from a third stage, the signals associated with the transfer statistic information from the first stage, and signals associated with the transfer statistic information and the enable statistic signals from the third stage are allowed to toggle or transition. The other statistic information signals associated with the first stage (e.g., first stage wait and first stage enable), signals associated with the second stage (e.g., second stage transfer, second stage wait, and second stage enable), and the other signals associated with the third stage (e.g. third stage wait) are not allowed to toggle or transition.

In one embodiment, a debug indication and a statistics enable indication are forwarded to the plurality of pipeline stages. In one embodiment, the statistics enable indication can be based on instructions received external from the pipeline and the debug indication is generated within the pipeline based on information received from external to the pipeline. In one exemplary implementation, the debug control component sets a debug indication in an information packet that flows through the pipeline.

In one embodiment, the debug control component can direct gathering of information at a variety of levels. In one exemplary, the debug control component is included in a graphics pipeline and the debug control component facilitates gathering statistic information on the primitive, vertex, and/or pixel levels.

Figure 1B:
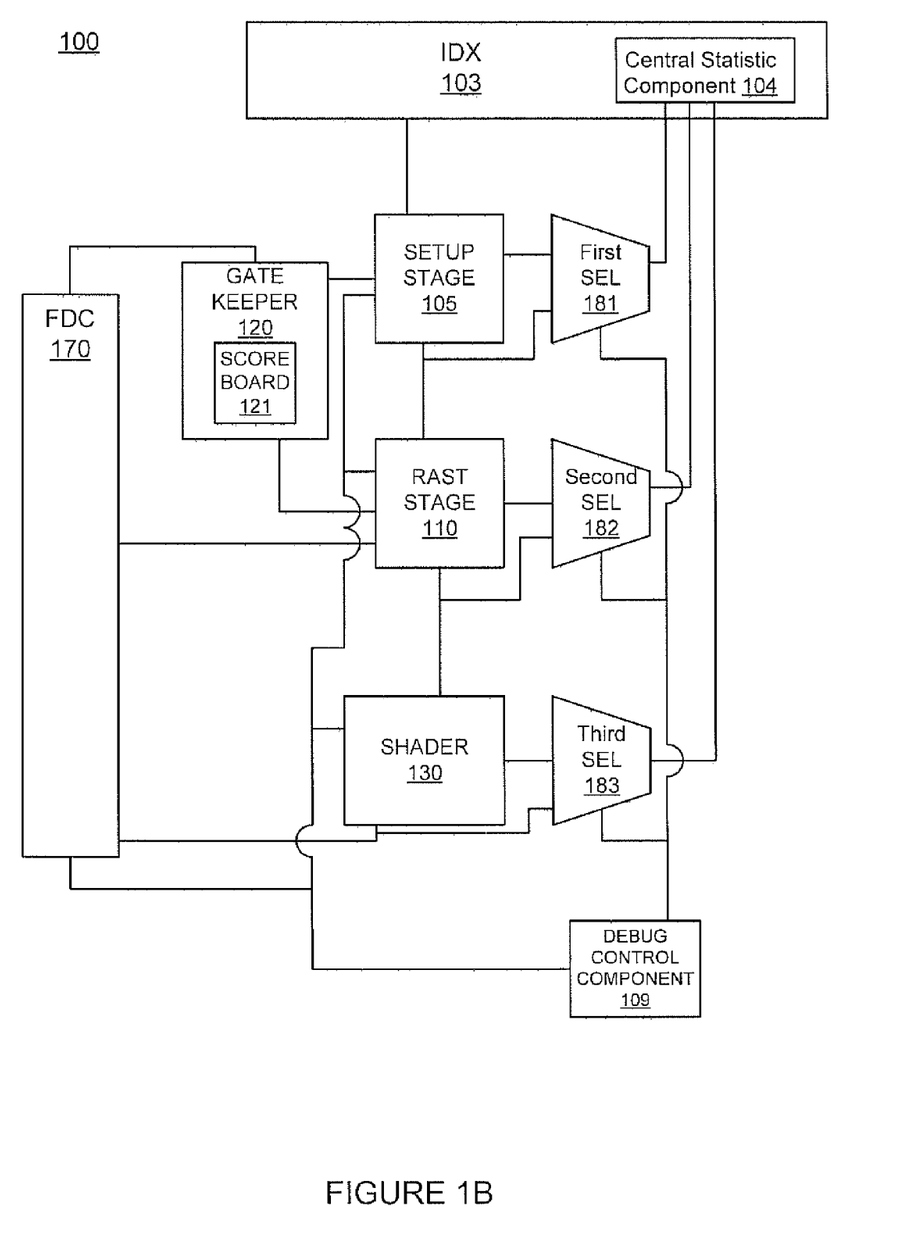
FIG. 1B is a block diagram of a graphics pipeline in accordance with one embodiment of the present invention.

FIG. 1B is a block diagram of an exemplary graphics pipeline 100 in accordance with one embodiment of the present invention. Graphics pipeline 100 facilitates efficient and effective utilization of processing resources. In one embodiment, graphics pipeline 100 processes graphics information in an organized and coordinated manner. Graphics pipeline 100 can implemented as a graphics processing core in a variety of different components (e.g., in a graphics processing chip or unit, in an application specific integrated circuit, a central processing unit, integrated in a host processing unit, etc.). Graphics pipeline 100 can operating upon a variety of geometrical primitives. Graphics pipeline 100 is also compatible with a variety of Very Large Instruction Word (VLIW) formats and operates on floating point and fixed point expressions.

Graphics pipeline 100 includes initial transform stage 103, setup stage 105, raster stage 110, gatekeeper stage 120, shader stage 130, memory 170, first selection component 181, second selection component 182, third selection component 183 and debug control component 109. In one embodiment of the present invention, a host provides graphics pipeline 100 with vertex data (e.g., points in three dimensional space that are being rendered) commands for rendering particular triangles given the vertex data, and programming information for the pipeline (e.g., register writes for lading instructions into different graphics pipeline 100 stages). The stages of graphics pipeline 100 cooperatively operated to process graphics information.

Initial transform stage 103 performs initial transformation of graphics information and direction of statistic and debug information gathering within the pipeline. In one embodiment, initial transform stage 103 includes central statistics component 104. In one exemplary implementation, central statistics component 104 is similar to central statistics component 30. Statistics and debug information associated with the initial transform stage can also be gathered.

Debug control component 109 directs the gathering of statistic and debug information. In one embodiment, debug control component 109 directs the gathering of information from a plurality of probe points within the pipeline. In one embodiment debug control component 109 is similar to debug control component 91. It is appreciated that either or both the central statistics component 104 and debug control component 109 can be external to the initial data translation stage as show or included in the initial data translation stage with the central statistic component 104.

Setup stage 105 receives vertex data and prepares information for processing in graphics pipeline 100. Setup stage 105 can perform geometrical transformation of coordinates, perform viewport transforms, perform clipping and prepare perspective correct parameters for use in raster stage 110, including parameter coefficients. In one embodiment, the setup unit applies a user defined view transform to vertex information (e.g., x, y, z, color and/or texture attributes, etc.) and determines screen space coordinates for each triangle. Setup stage 105 can also support guard-band clipping, culling of back facing triangles (e.g., triangles facing away from a viewer), and determining interpolated texture level of detail (e.g., level of detail based upon triangle level rather than pixel level).

Setup stage 105 can include a vertex buffer (e.g., vertex cache) that can be programmably controlled (e.g., by software, a driver, etc.) to efficiently utilize resources (e.g., for different bit size word vertex formats). For example, transformed vertex data can be tracked and saved in the vertex buffer for future use without having to perform transform operations for the same vertex again. In one embodiment, setup stage 105 sets up barycentric coefficients for raster 110.

Raster stage 110 determines which pixels correspond to a particular triangle and interpolates parameters from setup stage 105 associated with the triangle to provide a set of interpolated parameter variables and instruction pointers or sequence numbers associated with (e.g., describing) each pixel. For example, raster stage 100 can provide a "translation" or rasterization from a triangle view to a pixel view of an image and can perform scan or iteration operations. For example, raster stage 110 can process pixels of a given triangle and determine which processing operations are appropriate for pixel rendering (e.g., operations related to color, texture, depth and fog, etc.). Raster stage 110 is also programmable to facilitate reduction of power that would otherwise be consumed by unused features and faster rendering of simple drawing tasks, as compared to a hard-coded rasterizer unit in which features consume time or power (or both) whether or not they are being used.

In one embodiment, raster stage 110 also generates pixel packets utilized in graphics pipeline 100. Each pixel packet includes one or more rows and each row includes a payload portion and a sideband portion. A payload portion includes fields for various values including interpolated parameter values (e.g., values that are the result of raster interpolation operations). For example, the fields can be created to hold values associated with pixel surface attributes (e.g., color, texture, depth, fog, (x,y) location, etc.). Instruction sequence numbers associated with the pixel processing are assigned to the pixel packets and placed in an instruction sequence field of the sideband portion. The sideband information also includes a status field (e.g., kill field).

In one embodiment, raster stage 110 calculates barycentic coordinates for pixel packets. In a barycentric coordinate system, distances in a triangle are measured with respect to its vertices. The use of barycentric coordinates reduces the required dynamic range, which permits using fixed point calculations that require less power than floating point calculations. In one embodiment, raster stage 110 can also interleave even number pixel rows and odd number pixel rows to account for multiclock cycle latencies of downstream pipestages.

A present invention graphics pipeline system and method can facilitate efficient utilization of resources by limiting processing on pixels that do not contribute to an image display presentation. Z Raster stage 111 performs an analysis to determine relatively "early" in the graphics pipeline if a pixel contributes to the image display presentation. For example, an analysis of whether a pixel is occluded (e.g., has values associated with "hidden" surfaces that do not contribute to an image display presentation) is performed.

Gatekeeper stage 120 of FIG. 1A regulates the flow of pixels to lower stages of graphics pipeline 100. In one exemplary implementation, gatekeeper 120 also collects debug readback information from other graphics pipeline 100 stages (e.g., can handle debug register reads). In one embodiment of the present invention, gatekeeper stage 120 facilitates data coherency maintenance of data fetching and data writing. For example, gatekeeper stage 120 can prevent read-modify-write hazards by coordinating entrance of coincident pixels into subsequent stages of graphics pipeline 100 with on going read-modify-write operations. In one embodiment, gatekeeper stage 120 utilizes scoreboarding techniques to track and identify coincident pixel issues. For example, gatekeeper stage 120 can also utilize the scoreboard to track the screen locations of pixels that are in "flight" and being processed by downstream stages of the graphics pipeline tracks pixels that finish processing through the pipeline (e.g., by being written to memory or being killed).

Shading operations are performed at shader stage 130. In one exemplary implementation a variety of different operations are performed on pixel data. For example, shader stage 130 can execute shader operations (e.g., blending and combining) related to three-dimensional graphics including texture combination (texture environment), stencil, fog, alpha blend, alpha test, and depth test. Shader stage 130 can have multi-cycle latency per substage and therefore can perform a variety of arithmetic and/or logic operations (e.g., A*B+C*D) on the pixel surface attribute information to achieve shading coordination. In one exemplary implementation, shader stage 130 performs operations on scalar values (e.g., a scalar value associated with pixel surface attribute information).

Figure 1C:
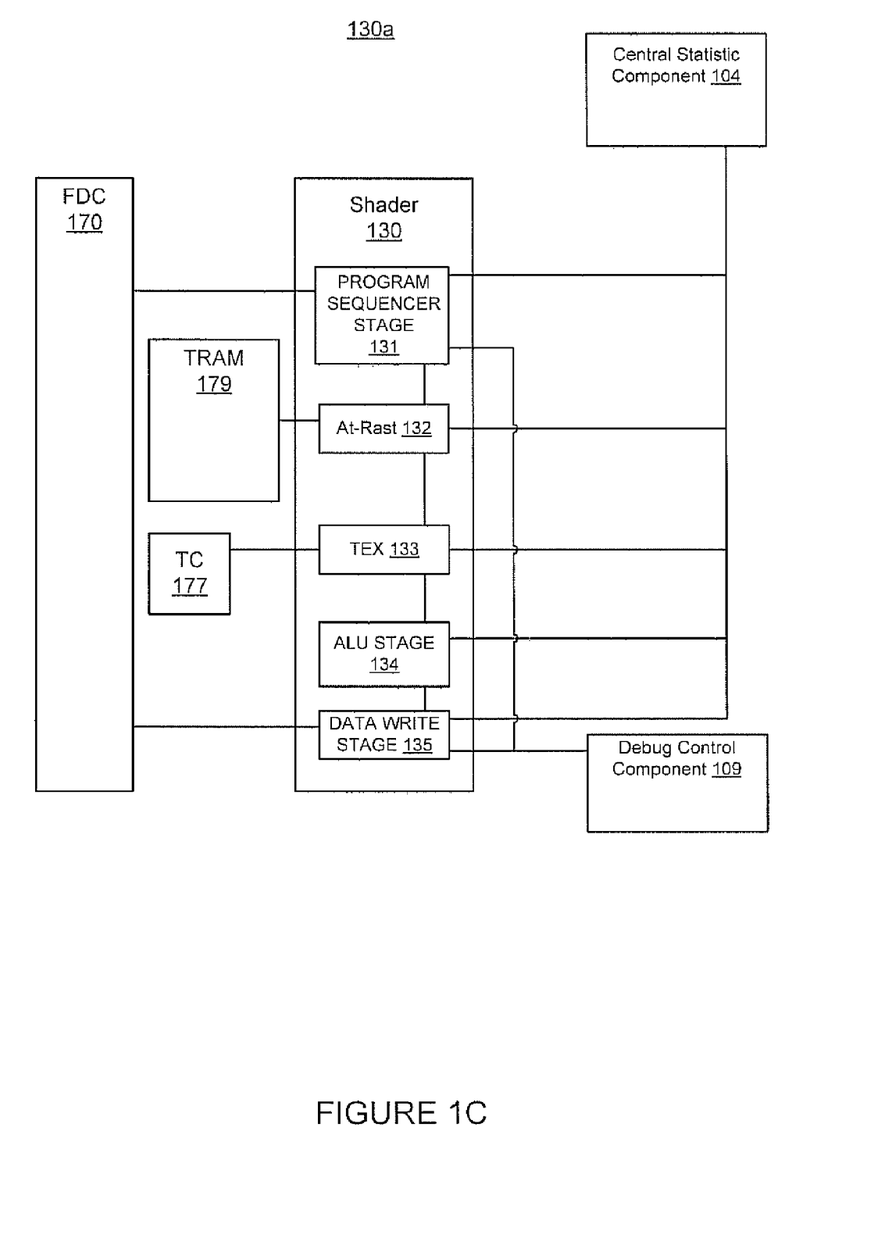
FIG. 1C is a block diagram of an exemplary shader stage in accordance with one embodiment of the present invention.

In one embodiment, the shader stage 130 includes program sequencer stage 131, attribute rasterization stage 132, texture stage 133, arithmetic logic unit stage 134 and data write stage 135. FIG. 1C is a block diagram of exemplary shader stage 130*a* in accordance with one embodiment of the present invention. In one embodiment, program sequencer stage 131 is coupled to attribute rasterization stage 132 which is coupled to texture stage 133 which in turn arithmetic logic unit stage 134 which is coupled to data write stage 135.

Program sequencer (P Seq) stage 131 functions by controlling the operation of the other downstream components of the graphics pipeline 100. In one embodiment, the program sequencer stage 131 works in conjunction with a graphics driver to implement a method for loading and executing a programmable shader. The program sequencer stage 131 can interact with the graphics driver (e.g., a graphics driver executing on the CPU) to control the manner in which the functional modules of the graphics pipeline 100 receives information, configure themselves for operation, and process graphics primitives. For example, graphics rendering data (e.g., primitives, triangle strips, etc.), pipeline configuration information (e.g., mode settings, rendering profiles, etc.), and rendering programs (e.g., pixel shader programs, vertex shader programs, etc.) can be received by the lower pipeline stage over a common input through the program sequencer from upstream pipeline stages (e.g., from an upstream raster module, from a setup module, or from the graphics driver).

In one embodiment, the program sequencer stage 131 directs execution of an indeterminate length shader program by controlling the operation of the other downstream modules of the graphics shader. In one exemplary implementation, the term "indefinite length shader program" refers to the fact that the shader programs that can be executed by a GPU are not arbitrarily limited by a predetermined, or format based, length. Thus for example, shader programs that can be executed can be short length shader programs (e.g., 16 to 32 instructions long, etc.), normal shader programs (e.g., 64 to 128 instructions long, etc.), long shader programs (e.g., 256 instructions long, etc.), very long shader programs (e.g., more than 1024 instructions long, etc) or the like. The program sequencer stage 131 can direct execution of indeterminate length shader programs by executing them in portions. Program sequencer stage 131 can also direct a recirculation data path for recirculating pixel information through shading and texture operations multiple for multiple passes or loops.

In one embodiment, program sequencer stage 131 is also responsible for fetching (e.g., reading) a plurality of different data types (e.g., color data, depth data, texture data, etc.) from a memory (e.g., memory 170) in a single stage. In one embodiment, a variety of different types of surface attribute information from the memory, including surface information related to pixels (e.g., pixels generated by a rasterization module). The surface information can also be associated with a plurality of graphics functions to be performed on the pixels and wherein the surface information is stored in pixel information (e.g., a pixel packet) associated with the pixels. Program sequence module 131 can read both efficient floating point expressions and fixed point expressions. In one embodiment, the efficient floating point expression is a 20 bit floating point expression. In one exemplary implementation, the efficient float point expression format conversion is defined by $(-1^s)$ times $(2^{exponent-bias})$ times $(1.\text{mantissa})$ where s is 1 bit, exponent is 6 bits, bias is 31 and the mantissa is 13 bits. The program sequence module can also retrieve 10 bit fixed point expressions.

Attribute rasterizer (AT-Rast) module 132 performs reciprocal, interpolation and normalization operations. In one embodiment, attribute raster module 132 is coupled to TRAM 179.

Texture retrieval module 133 retrieves texture information from a texture cache. In one embodiment, the texture cache is texture cache 177. In one exemplary implementation, texture cache 177 storage space is included in the same memory component as a fragment data cache memory storage e space. In one embodiment, the texture information is in a 10 bit fixed point expression format.

Arithmetic logic stage 134 (e.g., an ALU) of FIG. 1A performs shading coordination operations on pixel packet row payload information (e.g., pixel surface attribute information) received from program sequence stage 131. The arithmetic logic stage 134 can also perform texture operations. In one embodiment, the arithmetic logic unit includes a 20 bit register for storing one of the 20 bit floating point expressions or two of the 10 bit fixed point expressions.

Data write stage 135 forwards pixel processing results (e.g., color results, Z-depth results, etc.) out to memory. In one embodiment data write stage 135 forwards the results to a memory 170, which can be a fragment data cache. In one exemplary implementation, data write stage is under the control or program sequencer 131 forwards an indication to scoreboard 121 the pixel is no longer in flight. In one exemplary implementation, the data write stage forwards information to the fragment data cache in a 10 bit fixed point expression format.

In one embodiment, stages within a shader fragment loop (e.g., a pseq, atrast, tex, alu and dwr) set the statistic transfer indication, statistic wait indication, and statistic enable indication in a different way than the rest of the pipe. In one exemplary implementation, the fragment pipe pays attention a debug bit in a pixel shader packet in addition to a global instrument statistic enable.

In one embodiment, statistic and debug operations with the fragment or shader loop stages are governed by both statistics enable and debug enable. Gathering of an instrument statistic enable metric is indicted by an instrument state enable being inserted or deasserted (e.g., STEN=INSTRUMENT.STAT_EN). This is similar to the description of STAT_EN above. Gathering of a statistic transfer metric is indicated by a statistic transfer indication and a debug indication being asserted or set (e.g., SXFER=xfer&&pkt.dbg which can also be expressed as SXFER=xfer AND pkt.dbg). Gathering of a statistic wait metric is indicated by a statistic wait indication and debug indication being asserted or set (e.g., WAIT=wait&&pkt.dbg which can also be expressed as WAIT=wait AND pkt.dbg in which pkt.dgb is from the most recent valid packet). If statistic enable STEN is being used to instrument an event other than INSTRUMENT.STAT_EN then it follows a rule similar to XFER and WAIT gathering. Gather of the statistic enable other than INSTRUMENT.STAT_EN is then indicated by the statistic enable indication and debug indication being asserted or set (e.g., STEN=sten&&pkt.dbg which can also be expressed as STEN=sten AND pkt.dbg). In one exemplary implementation a program sequence stage (e.g., PSEQ) is responsible for setting a debug indication (e.g., pkt.dbg) for all pixel packet types.

In one embodiment the pixel packet types are set in accordance with the following logic:
PIX.DBG=STAT_EN&&DBG_FILTER
(which can also expressed as PIX.DBG=STAT_EN AND DBG_FILTER)
SPAN.DBG=STAT_EN&&DBG_FILTER
(which can also be expressed as SPAN.DBG=STAT_EN AND DBG_FILTER)
REG.DBG=STAT_EN&& prev_PKT.DBG
(which can also be expressed as SPAN.DBG=STAT_EN AND DBG_FILTER).

In one embodiment of the initial translation stage, there are multiple separate statistic components, each of which can be pointed at any of the probe points. In one exemplary implementation, each probe point is associated with four separate counters including a XFER_COUNT, WAIT_COUNT, CLK_COUNT, and EN_COUNT. The XFER_COUNT is a count of cycles when a statistic transfer metric is in a particular indication (e.g., a logic state, high, low, etc.). The WAIT_COUNT is a count of cycles when the statistic wait metric is in a particular indication (e.g., a logic state, high, low, etc). The CLK_COUNT is a count of cycle when the statistic enable is in a particular indication (e.g., logic state, high, low, etc.). The EN_COUNT is a count when a transition occurs in the statistic enable indication (e.g., a low to high transition, a high to low transition, etc.). In one exemplary implementation, the CLK_COUNT can be the number of clocks that collection is enabled and EN_COUNT is the number of times collection is enabled.

Figure 2A:
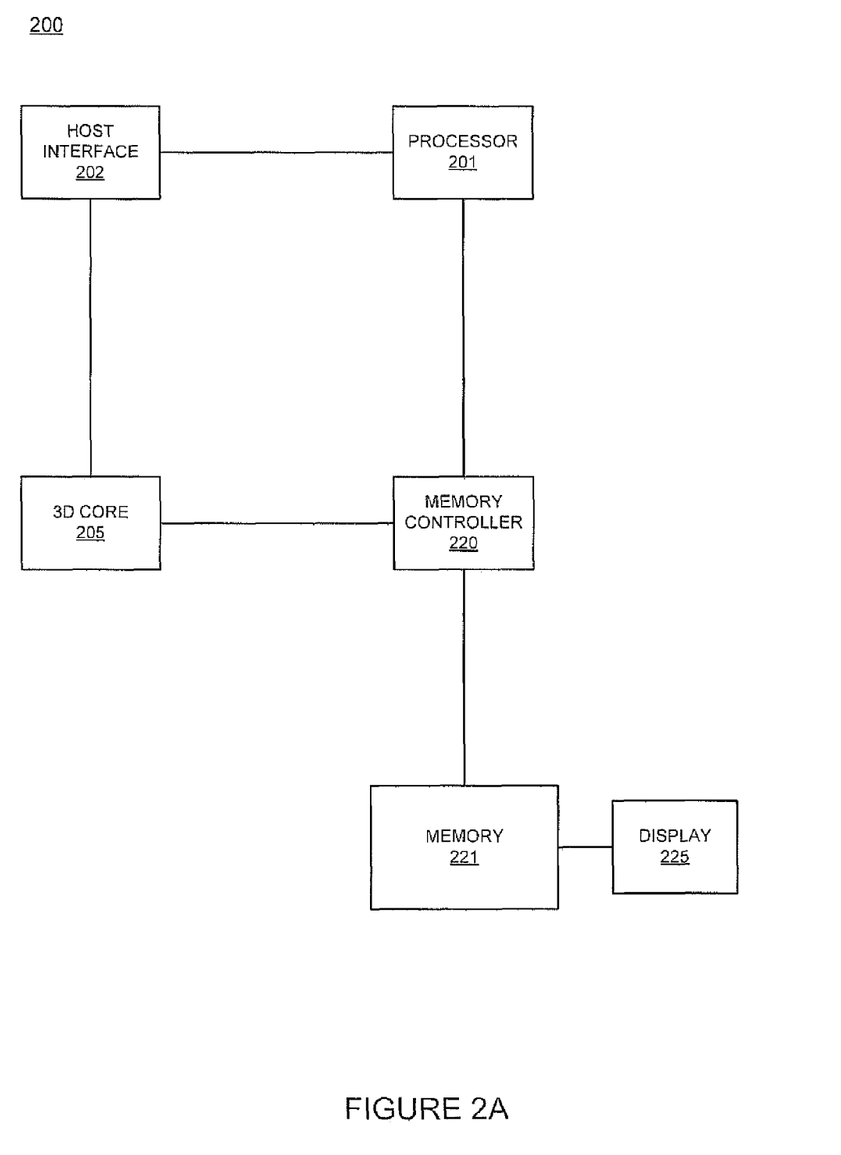
FIG. 2A is a block diagram of a computer system in accordance with one embodiment of the present invention is shown.

With reference now to FIG. 2A, a computer system 200 in accordance with one embodiment of the present invention is shown. Computer system 200 may provide the execution platform for implementing certain software-based functionality of the present invention. As depicted in FIG. 2, the computer system 200 includes a CPU 201 coupled to a 3-D processor 205 via a host interface 202. The host interface 202 translates data and commands passing between the CPU 201 and the 3-D processor 205 into their respective formats. Both the CPU 201 and the 3-D processor 205 are coupled to a memory 221 via a memory controller 220. In the system 200 embodiment, the memory 221 is a shared memory, which refers to the property whereby the memory 221 stores instructions and data for both the CPU 201 and the 3-D processor 205. Access to the shared memory 221 is through the memory controller 220. The shared memory 221 also stores data comprising a video frame buffer which drives a coupled display 225.

As described above, certain processes and steps of the present invention are realized, in one embodiment, as a series of instructions (e.g., software program) that reside within computer readable memory (e.g., memory 221) of a computer system (e.g., system 200) and are executed by the CPU 201 and graphics processor 205 of system 200. When executed, the instructions cause the computer system 200 to implement the functionality of the present invention as described below.

As shown in FIG. 2A, system 200 shows the basic components of a computer system platform that may implement the functionality of the present invention. Accordingly, system 200 can be implemented as, for example, a number of different types of portable handheld electronic devices. Such devices can include, for example, portable phones, PDAs, handheld gaming devices, and the like. In such embodiments, components would be included that are designed to add peripheral buses, specialized communications components, support for specialized 10 devices, and the like.

Figure 2B:
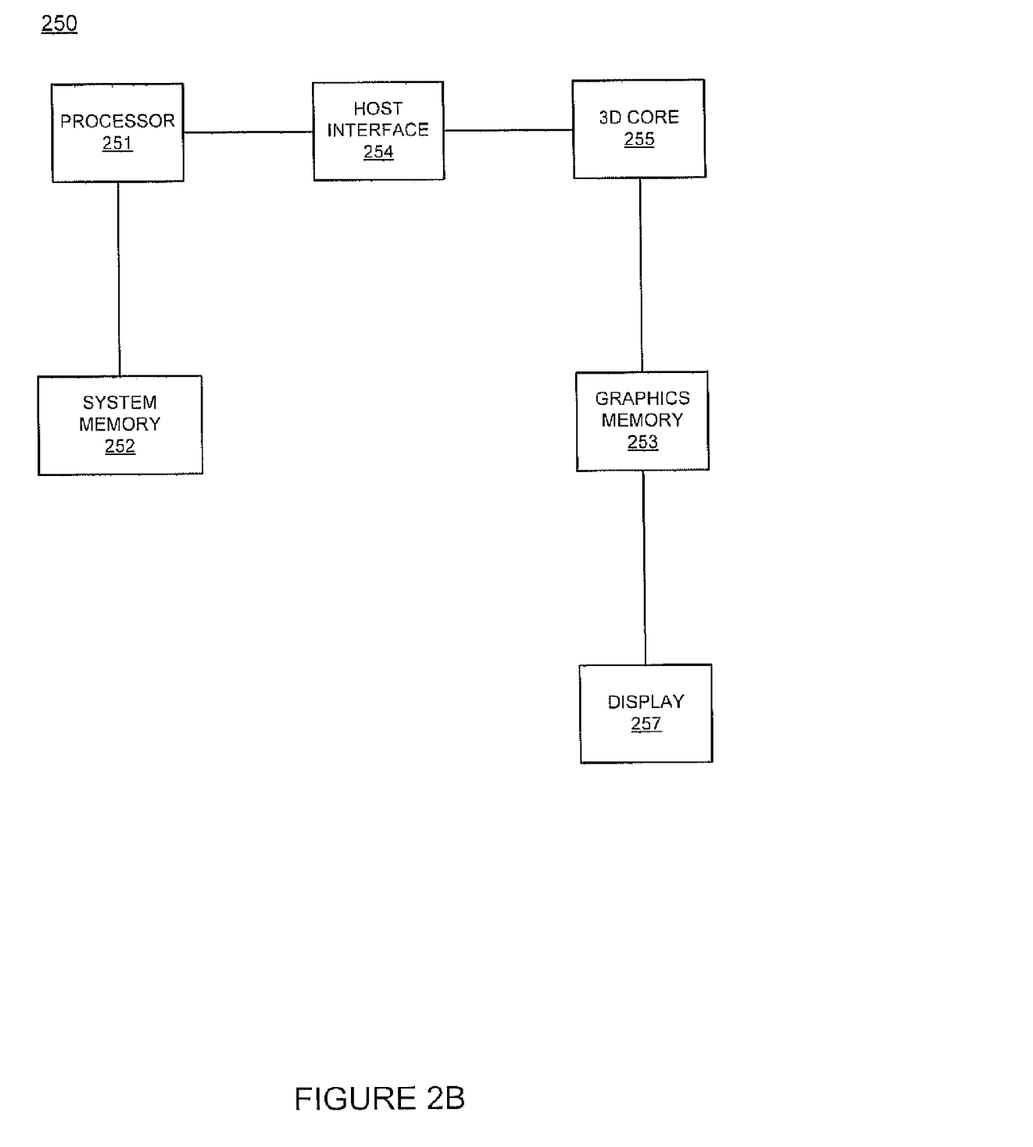
FIG. 2B is a block diagram of a computer system in accordance with one alternative embodiment of the present invention.

Additionally, it should be appreciated that although the components 201-257 are depicted in FIGS. 2A and 2B as a discrete components, several of the components can be implemented as a single monolithic integrated circuit device (e.g., a single integrated circuit die) configured to take advantage of the high levels of integration provided by modern semiconductor fabrication processes. For example, in one embodiment, the CPU 201, host interface 202, 3-D processor 205, and memory controller 220 are fabricated as a single integrated circuit die.

FIG. 2B shows a computer system 250 in accordance with one alternative embodiment of the present invention. Computer system 250 is substantially similar to computer system 200 of FIG. 2A. Computer system 250, however, utilizes the processor 251 having a dedicated system memory 252, and the 3-D processor 255 having a dedicated graphics memory 253. Host interface 254 translates data and commands passing between the CPU 201 and the 3-D processor 255 into their respective formats. In the system 250 embodiment, the system memory 251 stores instructions and data for processes/threads executing on the CPU 251 and graphics memory 253 stores instructions and data for those processes/threads executing on the 3-D processor 255. The graphics memory 253 stores data the video frame buffer which drives the display 257. As with computer system 200 of FIG. 2A, one or more of the components 251-253 of computer system 250 can be integrated onto a single integrated circuit die.

Figure 3:
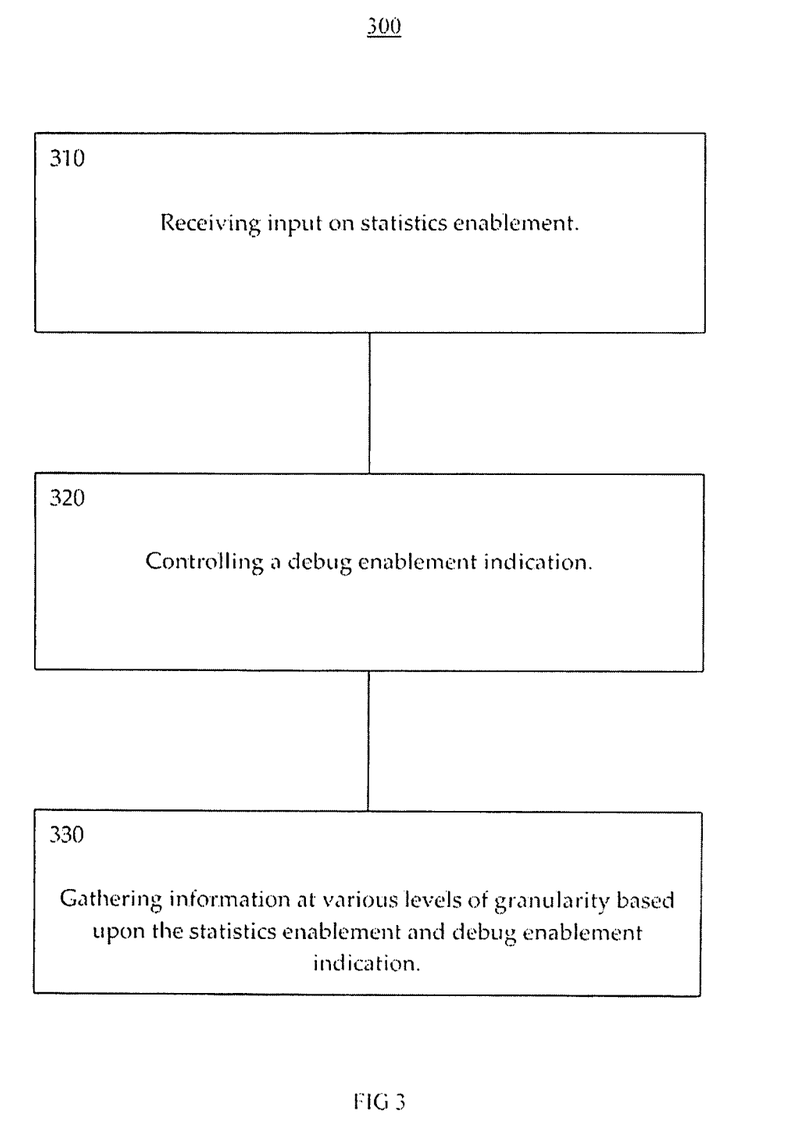
FIG. 3 is a flow chart of pixel processing method in accordance with one embodiment of the present invention.

FIG. 3 is a flow chart of a graphics processing method 300 in accordance with one embodiment of the present invention. In one embodiment, a graphics processing method 300 is performed by stages of a graphics processing pipeline. In one embodiment process 300 is performed by graphics pipeline 100. Instructions directing process 300 can be stored as instructions on a computer readable medium and executed on a processor.

In block 310 input on statistics enablement is received. In one embodiment the input on the statistics enablement is received from a component external to the pipeline.

In block 320, a debug enablement indication is controlled. In one embodiment, controlling the debug enablement includes examining filters to be engaged and ranges of information on which to perform the filter operations In block 330, information is gathered at various levels of granularity based upon the statistics enablement and debug enablement indication. In one embodiment, gathering information includes drilling down into particulars of a pipeline stage operations. Gathering information can include retrieving information from a plurality of probe points within a stage of the pipeline and/or between stages of the pipeline. Information a probe points associated with a memory servicing the pipeline can also be retrieved. In one embodiment, signal toggle or transitions on paths associated with the information is selectively activated based upon the statistics enablement and debug enablement indication.

In one embodiment the debug information (e.g., cmodel debug statements, instrumentation, etc.) are controlled by debug registers in accordance with the following logic:

DBG=((((DBG_X_EN=DISABLE)|
  ((X>=DBX_X.START)&&(X=DBX_X.END)))
  && ((DBG_Y_EN=DISABLE)|((Y>=DBX_Y.START)
    &&(Y>=DBX_Y.END)))
  && ((DBG_SEQ_EN=DISABLE)|
    ((SEQ>=DBG_CTL.SEQ_START)
    &&(SEQ<=DBG_CTL.SEQ_END)))
  && ((DBG_COMMAND_EN=DISABLE)|
    (PC=DBG_CTL.COMMAND))).

The && can also be expressed and a logical AND. The | can also be expressed as a logical OR. In one embodiment DBG=1 means debug is enabled and DBG=0 means debug is disabled. In other words, debugging is enabled unless an enabled test fails. In one exemplary implementation, the command allows retrieval of a range of sequence numbers by putting that range into a single EXECUTE command. The DBG bit in the pixel packet can be used by all fragment pipe modules to turn off instrumentation (e.g., if DBG=0 turn off instrumentation). It can also be used by model to turn off debug messages (e.g., if DBG=0 turn off debug msgs).

Thus, the present invention facilitates efficient and effective pixel processing. The present invention enables resource and power conservation by utilizing efficient debug and statistics gathering. The debug features enable troubleshooting to drill down into multiple levels of pipeline operations, including gathering of statistics and debug information at a pixel level. The debug features also facilitation flexible collection of statistics information. Minimizing transition of non-enable statistic and debug signals also facilitates conservation of power.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. In the claims, the order of elements does not imply any particular order of operations, steps, or the like, unless a particular element makes specific reference to another element as becoming before or after.

What is claimed is:

1. A pipeline system comprising:
   a plurality of pipeline stages of a graphics pipeline system with probe points;
   a central statistic component for gathering information at a pixel level from the probe points;
   a debug control component for directing the gathering of information at the pixel level from the probe points; and
   a hardware bus from the probe points to a central statistic component dedicated to communicating information between the probe points and the central statistic component, wherein the hardware bus communicates signals that are carrying information associated with enabled statistic and debug metrics;
   wherein the debug control component tracks how many times a pixel came down graphics pipeline and turned a debug functionality on and off.

2. The pipeline system of claim 1 wherein the debug control component can direct gathering of information at a variety of levels.

3. The pipeline system of claim 1 wherein a debug indication and a statistics enable indication are forwarded to the plurality of pipeline stages.

4. The pipeline system of claim 1 wherein the information gathered from the probe points includes information associated with a variety of metrics.

5. The pipeline system of claim 4 wherein the metrics include a transfer metric, and a statistic enable metric.

6. The pipeline system of claim 4 wherein signals associated with asserted metrics are allowed to transition without transitioning signals associated with unasserted metrics.

7. The pipeline system of claim 1 wherein the debug control component directs drilling down into the particulars of a drawing operation.

8. The pipeline system of claim 1 wherein the debugging can be performed at various levels.

9. The pipeline system of claim 1 wherein the debug control component gathers information at a vertex level or at a primitive level.

10. The pipeline system of claim 1 wherein pixel level filters include an X screen coordinate filter, a Y screen coordinate filter, an instruction sequence number filter and a function filter.

11. A pipeline method comprising:
    receiving input on statistics enablement;
    controlling a debug enablement indication; and
    gathering information by a processing device from probe points of a plurality of pipeline stages of a graphics pipeline system;
    wherein the information is gathered at a pixel level of granularity based upon the statistics enablement and debug enablement indication, wherein the information gathered is communicated from the probe point via a hardware bus path dedicated to communicating statistics and debug information; and
    wherein the processing device tracks how many times a pixel came down the graphics pipeline and turned a debug functionality on and off.

12. A pipeline method of claim 11 wherein the gathering information includes drilling down into particulars of a pipeline stage operations.

13. A pipeline method of claim 11 wherein the gathering information includes retrieving information from said probe point within a stage of the pipeline.

14. A pipeline method of claim 11 wherein the gathering information includes retrieving information from said probe point between stages of the pipeline.

15. A pipeline method of claim 11 wherein the gathering information includes retrieving information from said probe point, wherein said probe point is associated with a memory servicing the pipeline.

16. A pipeline method of claim 11 wherein the gathering includes selectively activating signal transition on paths associated with the gathering of information based upon the statistics enablement and debug enablement indication.

17. A pipeline method of claim 11 wherein the controlling the debug enablement includes examining filters to be engaged and ranges of information on which to perform filter operations.

* * * * *